Patented Jan. 8, 1935

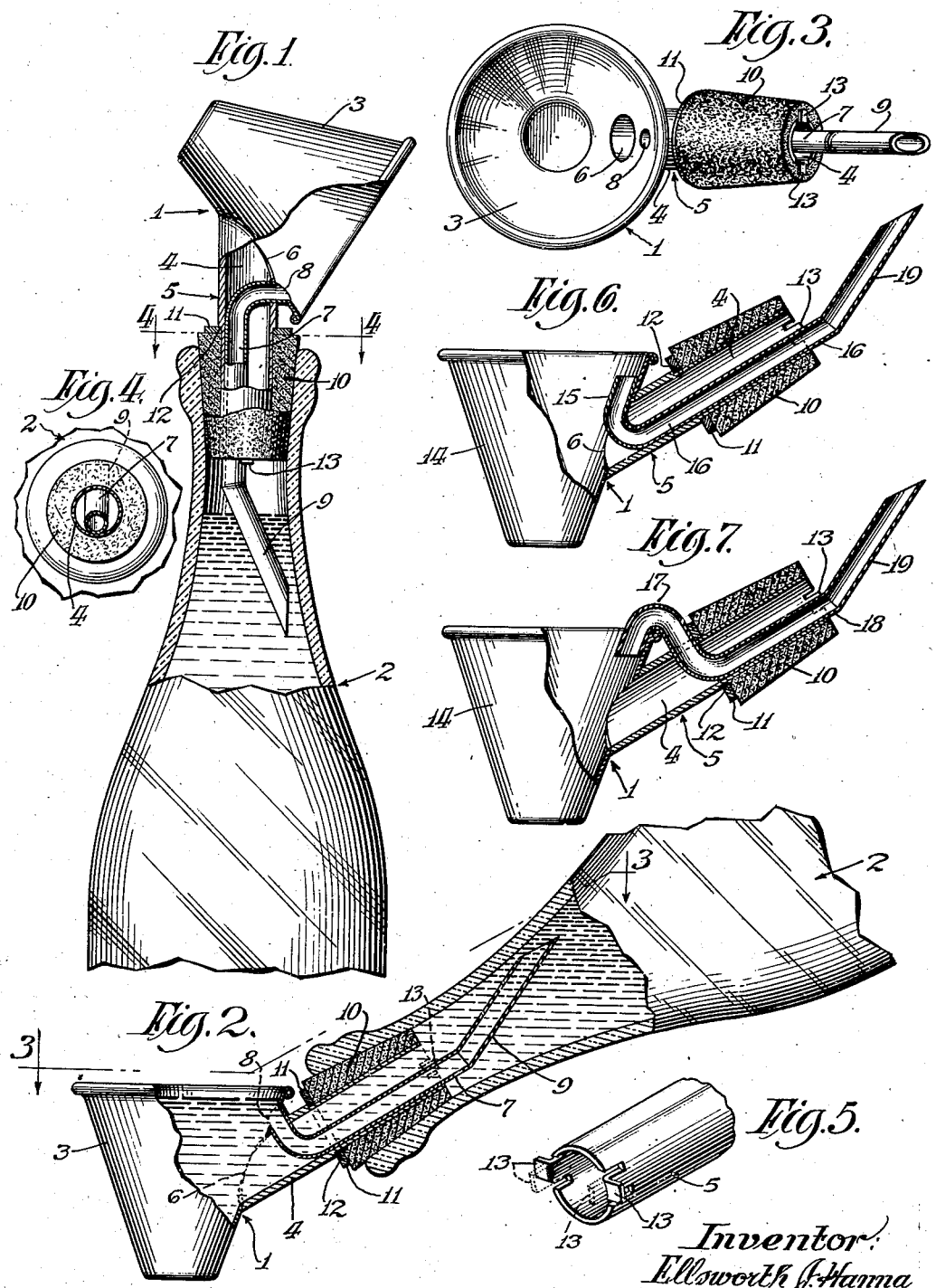

1,986,811

UNITED STATES PATENT OFFICE 1,986,811

AUTOMATIC LIQUID MEASURE

Ellsworth J. Hanna, Evanston, Ill.

Application June 2, 1934, Serial No. 728,697

5 Claims. (Cl. 221—98)

The present invention relates to a liquid measure and more in particular to a novel attachment for a bottle or other liquid container by which the dispensed liquid may be accurately and automatically measured without the danger of spilling.

Among the objects of the present invention is the provision of a novel liquid measure and dispensing device whereby a predetermined and definite amount or quantity of liquid may be poured from a bottle or other container.

A further object of the invention is the provision of a novel liquid measure whereby a predetermined amount of liquid may be poured without loss or danger of spilling.

Another object of the present invention is the provision of a liquid measure and dispensing device whereby a definite and predetermined quantity of liquid may be safely poured in a minimum period of time. Such liquid may be poured and dispensed under the most trying conditions as in the pouring thereof on a moving train, boat, bus, automobile, airplane, or wherever difficulty is encountered in pouring a desired quantity of liquid.

A still further object is the provision of a novel attachment for a bottle or other container, in which the attachment forms a stopper or closure as well as a measure and dispensing device which accurately measures and dispenses a predetermined and desired amount of liquid.

The invention is admirably adapted and has a wide spread application in the pouring and dispensing of liquor for the purpose of making or mixing drinks, and where an accurate and predetermined quantity of one or more given liquors and/or liquids is essential to the proper mixture or concoction. However, it is to be understood that the invention has a wider field of application and may be employed for the pouring of any liquid or fluid from a bottle or other container where an accurate quantity of the same is desired.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangements of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:—

Fig. 1 is a fragmentary view, part in side elevation and part in vertical cross section, of the novel measure mounted in a bottle or other container.

Fig. 2 is a view similar to Fig. 1, but with the bottle tilted and the measure in a position to receive a predetermined quantity or level of liquid.

Fig. 3 is a plan view of the measure and taken on the line 3—3 of Fig. 2.

Fig. 4 is a view in horizontal cross-section taken in a plane represented by the line 4—4 of Fig. 1.

Fig. 5 is a fragmentary view in perspective of the inner end of the shank or inlet for the measure.

Figs. 6 and 7 are views part in side elevation and part in vertical cross-section of alternate forms of the novel liquid measure.

Referring more particularly to the disclosure in Figs. 1 to 5, inclusive, the novel measure 1 is shown as an attachment for a bottle or other liquid container 2. The measuring device 1 comprises an open cup-shaped receptacle 3 of a predetermined size and desired shape and provided with an inlet 4. The inlet is in the form of a hollow tube or shank 5 suitably secured or attached to the receptacle as by means of solder or the like, and communicating at its one end with an opening 6 in the receptacle and its other end with the interior of the bottle or container 2 for receiving the contents thereof.

Within the tube or shank 5 is mounted a smaller tube or conduit 7, forming an air vent and communicating at its one end with an opening or port 8 in a side wall of the receptacle, and its opposite end 9 communicating with the interior of the bottle or other container. As shown in the drawing, the bent end of tube 7 is extended through the wall of shank 5, in such manner as to retain the vent and the shank in a predetermined fixed position.

The shank of the receptacle is adapted to function as a stopper for the bottle or container, and for that purpose is provided with a cork shell 10 retained between a washer 11 seating against a shoulder 12, and lips or projections 13 formed at the inner end of the tube or shank 5.

In Figs. 6 and 7 are shown alternate constructions, in which the receptacle 14 is of the same shape, but the tube forming the air vent does not communicate with an opening in a side wall of the receptacle, but in Fig. 6 the one end 15 of the tube 16 is positioned within the receptacle and opens upwardly, while in Fig. 7 the one end 17 of the tube 18 communicating with the receptacle opens downwardly. In each alternate form the opposite end 19 of the smaller tube is inclined similar to the form shown in Figs. 1 to 5, inclusive.

In each form the opening of the air vent leading from the receptacle to the bottle or other container is placed at a level above that of the liquid inlet. Thus air flows through the smaller tube or air vent to the interior of the bottle, whereby to replace liquid poured or flowing therefrom, until such time as the liquid level in the receptacle rises to a height sufficient to cover the opening to the air vent to thereby prevent further flow of air to the interior of the bottle. As soon as the air stops flowing to displace the liquid content of the bottle, the liquid stops flowing through the tube or shank 5 and the amount of liquid in the receptacle is determined.

It will be readily apparent from the above description and the disclosure in the drawing that the invention comprises a novel liquid measure in which the quantity of liquid is accurately and automatically determined, and after such predetermined amount is poured into or received in the receptacle such content may be poured without any danger of spilling.

Having thus disclosed the invention, I claim:

1. An automatic liquid measure comprising an open-mouthed receptacle for receiving and dispensing an accurately measured predetermined quantity of liquid, a hollow shank communicating at one end with said receptacle and at its other end with the interior of a bottle or other container, and an air vent leading from said receptacle to the interior of the bottle or container and so located as to stop the flow of liquid through said shank when said measured quantity has been received in the receptacle, said vent being fixed in said shank with its inlet end offset with respect to the shank and terminating flush with a side wall of the receptacle whereby the interior of the receptacle is free from all obstructions to permit a thorough cleaning of the interior of the receptacle.

2. An automatic liquid measure adapted to be mounted on a bottle or other container and comprising in combination an open receptacle, a shank connected to said receptacle and forming an inlet therefor, and an air vent in said shank communicating with the receptacle and interior of said container and rigidly connected to the shank and to the side wall of the receptacle at the point where it enters said receptacle whereby to fixedly retain the vent and shank in predetermined fixed position so as to accurately measure the dispensed liquid.

3. An automatic liquid measure comprising an open-mouthed receptacle for receiving and dispensing liquid, a hollow member having its one end connected to said receptacle and adapted to be mounted on a bottle or other container and communicating therewith, and a tube leading from said receptacle and adapted to communicate with the interior of the container and forming an air vent for admitting air to said container, the inlet of said tube extending to and terminating in a side wall of the receptacle adjacent the opening to said member, said receptacle having an unobstructed interior to permit ready cleaning of the receptacle and said air vent accurately and automatically regulating the quantity of liquid flowing to said receptacle.

4. A sanitary liquid measure for automatically and accurately measuring and dispensing a predetermined quantity of liquid, comprising in combination a receptacle having a completely unobstructed interior and a discharge outlet of greater cross section than the remainder of the receptacle whereby to permit ready dispensing of the measured liquid, a hollow shank communicating with the interior of said receptacle and its other end adapted to be positioned in the outlet of a bottle or other container, and an air vent tube having its inlet terminating adjacent to and rigidly connected with a side wall of said receptacle and its outlet adapted to extend into the container, said tube being further mounted through a substantial part of its length on the interior of the shank whereby to rigidly retain said tube and prevent damage thereto in the insertion and removal of the measure from the container.

5. An automatic measure adapted to be mounted in the discharge end of a bottle or other container for accurately measuring and dispensing a given quantity of a fluid, comprising a receptacle for receiving and dispensing said fluid, a shank on said member communicating at one end with said receptacle and at its other end with the interior of the container, an air vent disposed in said shank and communicating with the interior of the receptacle and of the container, a stopper encompassing said shank and adapted to form a seal with the discharge end of said container, an abutment on said shank against which an end of said stopper seats, and projections on an end of said shank adapted to seat against the opposite end of said stopper for retaining it against longitudinal displacement.

ELLSWORTH J. HANNA.